United States Patent
Tosatti et al.

(10) Patent No.: US 9,354,916 B2
(45) Date of Patent: May 31, 2016

(54) DETECTION OF GUEST DISK CACHE

(71) Applicant: Red Hat, Inc., Raleigh, NC (US)

(72) Inventors: Marcelo Tosatti, Curitiba (BR); Avi Kivity, Tel Aviv (IL); Henri Han Van Riel, Merrimack, NH (US)

(73) Assignee: Red Hat Israel, Ltd., Raanana (IL)

( * ) Notice: Subject to any disclaimer, the term of this patent is extended or adjusted under 35 U.S.C. 154(b) by 294 days.

(21) Appl. No.: 13/689,600

(22) Filed: Nov. 29, 2012

(65) Prior Publication Data

US 2014/0149634 A1    May 29, 2014

(51) Int. Cl.
*G06F 9/45* (2006.01)
*G06F 9/455* (2006.01)

(52) U.S. Cl.
CPC .. *G06F 9/45558* (2013.01); *G06F 2009/45579* (2013.01)

(58) Field of Classification Search
CPC . G06F 9/45558; G06F 9/45533; G06F 9/544; G06F 2009/45583; G06F 2009/45579
See application file for complete search history.

(56) References Cited

U.S. PATENT DOCUMENTS

| | | | |
|---|---|---|---|
| 2005/0289315 A1* | 12/2005 | Achanta | G06F 12/0269 711/170 |
| 2011/0029821 A1* | 2/2011 | Chow et al. | 714/45 |
| 2012/0011504 A1* | 1/2012 | Ahmad et al. | 718/1 |
| 2012/0272241 A1* | 10/2012 | Nonaka et al. | 718/1 |
| 2013/0205106 A1* | 8/2013 | Tati et al. | 711/159 |

* cited by examiner

*Primary Examiner* — Kevin Verbrugge
*Assistant Examiner* — Rocio Del Mar Perez-Velez
(74) *Attorney, Agent, or Firm* — Lowenstein Sandler LLP

(57) ABSTRACT

A virtual machine disk page detector running on a computing device detects guest disk cache usage. The detector detects a request from a virtual operating system to read an object into a virtual memory page from a virtual disk, maintains a record of a page identifier and a corresponding virtual disk address in a guest cache data structure, and modifies a protection identifier of the virtual memory page to indicate that the virtual memory page is protected.

20 Claims, 5 Drawing Sheets

DETECTION OF GUEST DISK CACHE

TECHNICAL FIELD

The embodiments of the disclosure relate generally to virtual machine systems and, more specifically, relate to a mechanism for detection of virtual machine disk cache.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

One function of the host machine is to manage available memory between the host operating system and the guest operating systems. Memory usage can be generally categorized into two categories: page cache; and anonymous memory. Page cache is a cache of an object stored on a disk. When a file is modified, the new data is stored in page cache before being written back to the disk. When a page in memory has new data that has not yet been "written back," the page is referred to as "dirty." Pages not referred to as "dirty" are "clean." The host machine can reclaim clean pages.

Anonymous memory can refer to a memory allocation that is not associated with an object or file in a known location. Anonymous memory, for example, may be a memory allocation dedicated to one or more VMs. Over time, the guest OS allocates and frees memory, but traditional hypervisors cannot reclaim anonymous memory.

BRIEF DESCRIPTION OF THE DRAWINGS

Embodiments of the present disclosure are illustrated by way of example, and not by way of limitation, and can be more fully understood with reference to the following detailed description when considered in connection with the figures in which.

DETAILED DESCRIPTION

Figure 1:
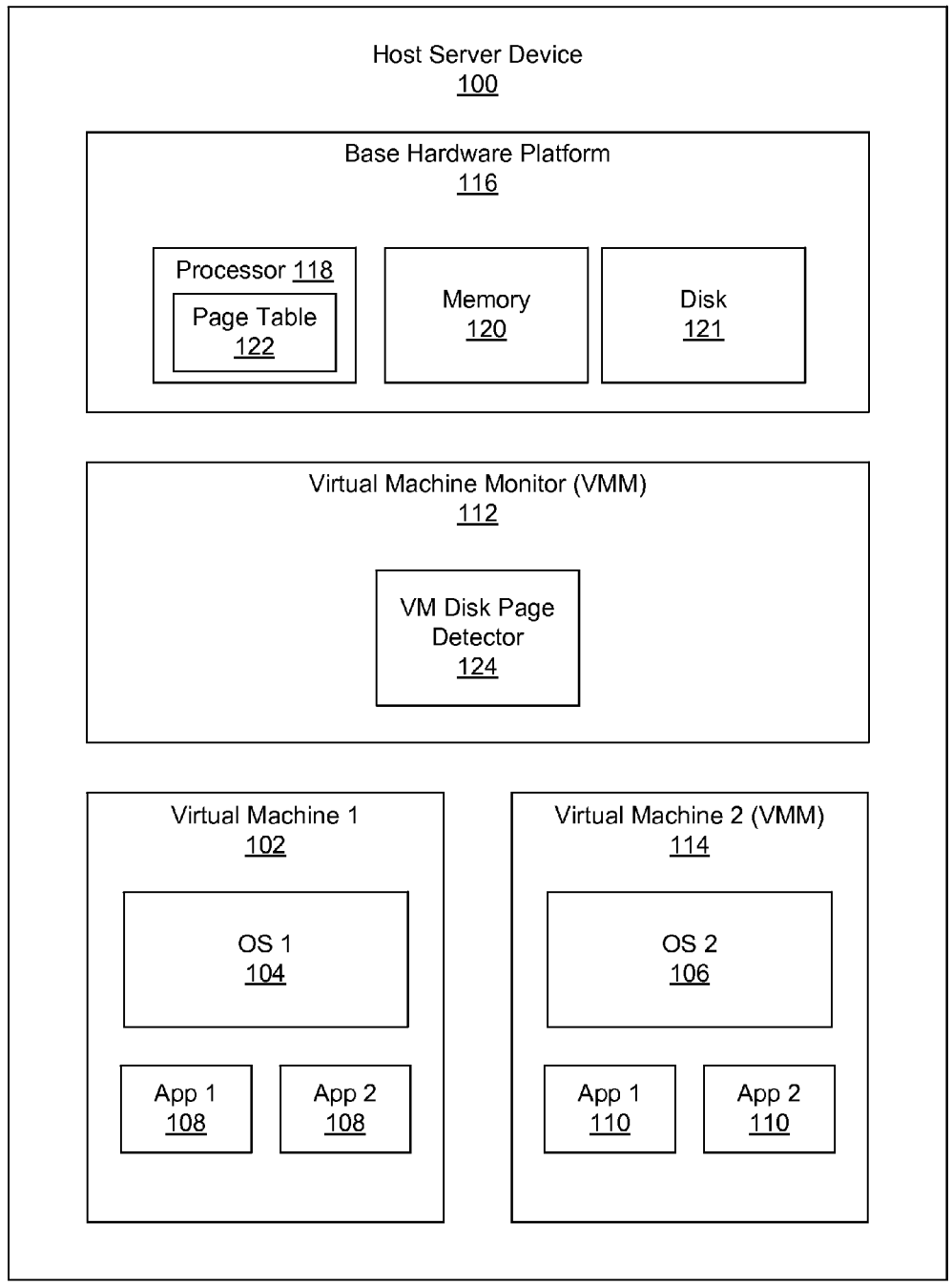
FIG. 1 illustrates one embodiment of a virtual machine (VM) host server device in accordance with an embodiment of the present invention.

Described herein are methods and systems for detecting guest disk cache usage. Embodiments of the present disclosure provide a detector configured to provide a protection identifier to a page entry in a page table and detect a request to read an object into a virtual memory page from a virtual disk. Once detected, the detector modifies the protection identifier of the page entry to indicate that the virtual memory page is protected.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "identifying", "detecting", "analyzing", "copying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

FIG. 1 illustrates one embodiment of a virtual machine (VM) host server device 100, which employs a virtual-machine monitor (VMM) 112 to perform guest disk cache detection. As illustrated, the base platform hardware 116 comprises a computing platform, which may be capable of, for example, executing an operating system (OS) or a virtual-machine monitor (VMM), such as VMM 112. In some embodiments, the base hardware platform 116 includes a processor 118, memory devices 120, disks 121, network devices, drivers, and so on. The VMM 112 virtualizes the physical resources of the base hardware platform 116 for one or more VMs 102, 114 that are hosted by the server device 100 having the base hardware platform 116. In some embodiments, VMM 112 may also be referred to as a hypervisor, a kernel-based hypervisor (e.g., Kernel-based VM (KVM)), or a host OS.

In one embodiment, each VM 102, 114 includes a guest operating system (OS), such as guest OS 104 or 106, and various guest software applications 108-110. The VMM 112 provides hardware emulation, as is well known to those of skill in the art, to the VMs 102, 114. The VMM 112 presents to the VMs 102, 114 a virtual operating platform and manages the execution of the guest operating systems 104, 106. Multiple instances of a variety of operating systems may share the virtualized hardware resources. The VMM 112 allocates a certain amount of the host server device 100 resources to each of the VMs 102 114. Each VM 102, 114 is then able to use the allocated resources to execute applications 108, 110. The VMM 112 virtualizes the underlying hardware of the host server device 100 or emulates hardware devices, making the use of the VM 102, 114 transparent to the guest operating system 104, 106.

The VMM 112 manages the memory usage of the VMs 102, 114. Both virtual memory and physical memory 120 may be divided into pages which are identified with a unique number, often known as Page Frame Numbers (PFN). The processor 118, in one embodiment, handles address translation between virtual and physical memory using a page table 122. The page table 122 is a data structure used by the VMM 112 to store a mapping of virtual addresses (e.g., used by the VMs 102, 114) to physical addresses (e.g., used by the base hardware platform 116). Each process or application operating within the VMs 102, 114, is given the impression that there is a contiguous section of memory available, when in reality, the available memory may be spread across memory 120 and a swap partition of the disk 121, for example. The page table 122 will be discussed in greater detail hereinafter with reference to FIG. 2.

Memory usage can be generally categorized into two categories: pagecache; and anonymous memory. Pagecache is a cache of an object stored on the disk 121. When a file or object is read from the disk 121 or a network location, the contents are stored in memory 120 as pagecache. When a file is modified, the new data is stored in pagecache before being written back to the disk. When a page in memory 120 has new data that has not yet been "written back," the page is referred to as "dirty." Pages not referred to as "dirty" are "clean." The VMM 112 can reclaim clean pages if there is a memory shortage by freeing or releasing the page because a clean page is identical to the object on the disk 121 and may be reread from the disk 121 if requested by the host server device 100 or VM 102, 114.

Anonymous memory is a memory allocation that is not associated with an object or file in a known location (e.g., the disk 121 or a network location). Anonymous memory, for example, may be a memory allocation dedicated to one or more VMs 102, 114. Over time, the guest OS 104, 106 allocates and frees memory, but traditional hypervisors cannot reclaim anonymous memory from VMs 102, 114 without modifying the VMs 102, 114 with custom storage drivers. In other words, traditional hypervisors cannot detect that a page of memory used by the VM operating systems, such as VM 102, 114, is an exact copy of disk content, without custom modifications to the VM OS.

Embodiments of the present disclosure address this by using a virtual machine disk page detector 124 of the VMM 112 to detect when a VM 102, 114 is reading data from a virtual disk into a page of virtual memory (which occupies a portion of memory 120) and allow anonymous memory to share some of the advantageous properties of pagecache memory. The detector 124, in one embodiment, "converts" or enables the anonymous memory to have the benefits of pagecache memory by write-protecting the data read into the page of virtual memory. By prohibiting the guest OS 104, 106 from modifying the page with the write-protected status, the page of virtual memory is identical to the data in the virtual disk. The VMM 112 may then reclaim the page of memory by freeing the page of memory, without making any modifications to the operating system of the VMs 102, 114.

In one embodiment, the detector 124 is configured to identify when a VM 102, 114 requests that data from a virtual disk be read into a page of virtual memory, and clear a protection identifier in the page table 122. For example, the protection identifier may be a binary value (e.g., the "writeable bit" of the page table 122) with the value "1" indicating a page is writable, and the value "0" indicating the page is not writable, or vice versa. Alternatively, the detector 124 is configured to utilize the "dirty" bit to detect whether a VM operating system has written to a memory page. Stated differently, when reading an entire page from virtual disk into memory, the detector 124 clears the dirty bit. If upon later inspection, the detector 124 discovers that the dirty bit remains clear, which indicates that the page has not been modified, then the VMM 112 may reclaim the page because a copy of the page may be retrieved from the virtual disk.

In one embodiment, if the VMs 102, 114 attempt to modify pages that are write protected, a page fault occurs. A page fault procedure allows write permission thereby removing the pages from a virtual disk copies list. In another embodiment, the detector 124 is configured to modify the protection status of the protection identifier in the page table 122 if the VM 102, 114 modifies the page in virtual memory. For example, the VMM 112 may allow the VMs 102, 114 to modify pages in virtual memory despite a protection status that indicates the memory page is write-protected. In this situation, the detector 124 changes the protection status of the protection identifier to writeable from not-writeable (write-protected). Similarly, the detector 124, in another embodiment, may alter the status of the dirty bit to indicate the page in virtual memory has been modified. In both examples, the result may be a page in virtual memory that the host server device 100 does not attempt to reclaim.

When the memory 120 in the host server device 100 system runs out, the VMM 112 determines which memory pages to reclaim. The VMM 112 shares the physical pages in the host server device 100 system between the processes running in the host server device 100, and therefore the VMM 112 may need to remove one or more pages from the system to make room for the new page to be brought into memory 120. One technique for selecting which page to reclaim from memory includes determining an age (e.g., when was the page last accessed), and determining if a page has been modified. The more that a page is accessed, the younger it is; the less that it is accessed the older it becomes. If the page to be removed has not been written to, then the page does not need to be saved and the page can be discarded. If the application, operating system, or process needs that discarded page again it can be brought back into memory from the image or data file again. However, if the page has been modified, the host server device preserves the contents of that page in a swap file, for example.

Figure 2:
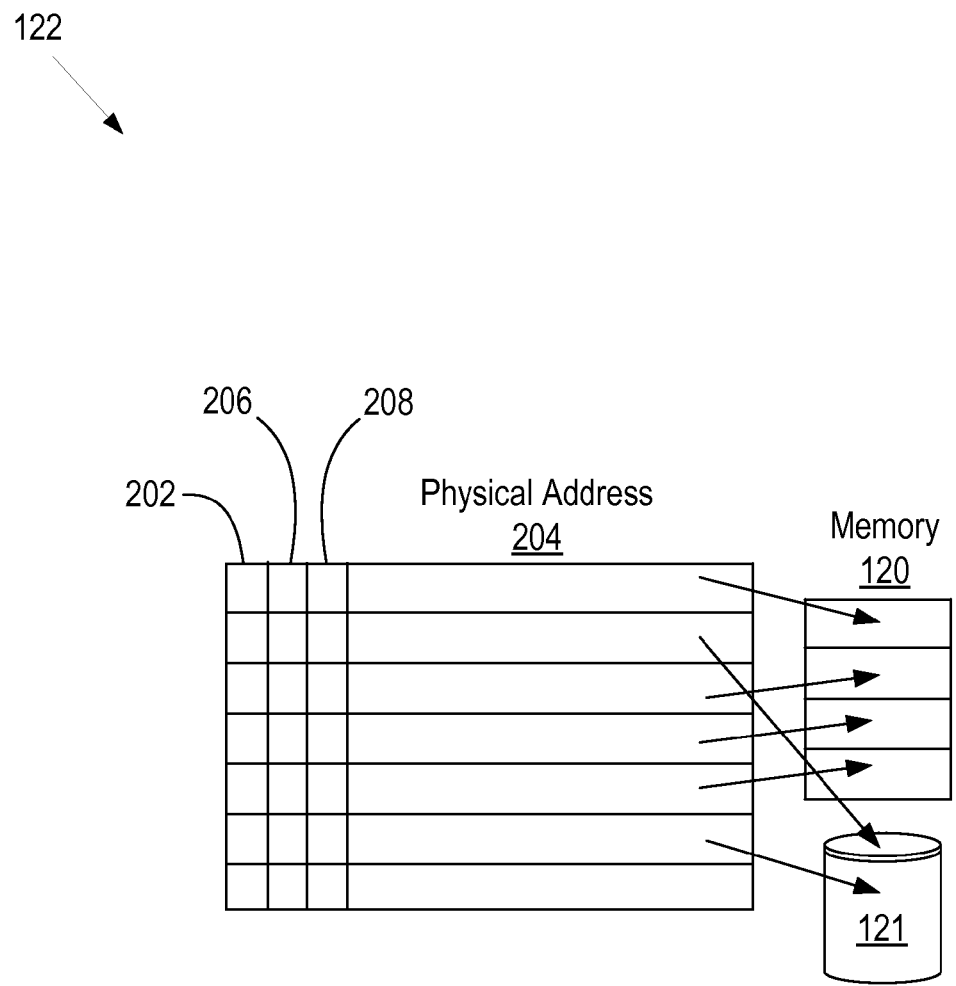
FIG. 2 illustrates a page table in accordance with an embodiment of the present invention.

FIG. 2 illustrates a page table 122 usable under embodiments of the invention. The page table 122, as described above, is used by the VMM 112 to manage the address space of the VMs. For example, the pagetable 122 is a two dimensional pagetable (e.g., EPT, NPT) or a mapping of virtual to physical memory locations.

The depicted page table 122 is a simplified block diagram illustrating a page table for descriptive purposes only, and is not intended as a limitation of the embodiments of the present description. The page table 122 comprises page entries that map a virtual PFN 202 with a physical address 204. The address translation may be based on a translation look-aside buffer (TLB) controlled by the processor 118 and the page table 122. The processor 118 may support a number of different paging modes including, but not limited to, 32-bit linear address space using a two-level hierarchical paging structure. Other paging modes include, for example, Physical Address Extension mode, Intel extended page table, AMD nested page tables, and INTEL Extended Memory 64 Technology mode.

The page table 122, in one embodiment, also includes information about the page including statistics information or other background information. The page table 122, as illustrated includes a dirty identifier 206 and a protection identifier 208. A page on disk 121 that is paged in to memory 120, but is not modified, does not need to be written back to disk. However, if the page in memory 120 is modified, the dirty identifier 206 indicates that the modifications must be written back to the disk 121.

The protection identifier 208 indicates the protection status of the page. In one embodiment, the protection status includes whether the page is writable, or write-protected. The detector 124 identifies when a virtual machine reads a page from a virtual disk into virtual memory and modifies the protection identifier 208 to indicate that the page in virtual memory is write-protected. In one example, the protection identifier 208 is a binary value where '0' indicates the page in virtual memory is writable, and '1' indicates the page is write-protected (e.g., not writable). In this example, the detector 124 sets the protection identifier 208 to a value of '1' when the detector 124 detects a page read request from a virtual disk into virtual memory. As such, the host device can reclaim the memory used by the page because, due to the write-protected status, the page has not been modified and an exact copy is stored in the virtual disk. In other words, there is little risk to freeing the memory because, if needed, the page can be retrieved again from the virtual disk.

In another embodiment, the detector 124 is configured to control a processor to modify the dirty identifier 206 as an alternative to write-protecting the page. When the detector 124 identifies that a virtual machine is reading an entire page from virtual disk into virtual memory, the detector 124 modifies the dirty identifier 206 to indicate that the page is "clean." In one embodiment, the dirty identifier 206 is a binary value where "0" indicates a clean page and a "1" indicates a dirty page. If, when the host system needs to reclaim memory, the detector 124 notes that the dirty identifier 206 has not been modified, the host system may safely reclaim the "clean" page. In one embodiment, the detector 124 is configured to control a processor to modify the protection status of the protection identifier 208 in the page table 122 if the VM 102, 114 modifies the page in virtual memory.

The present disclosure is described hereinafter with reference to flowchart and/or block diagram illustrations of methods, systems, and computer program products according to an embodiment of the disclosure. It will be understood that each block of the flowchart and/or block diagram illustrations, and combinations of blocks in the flowchart and/or block diagram illustrations, may be implemented by processing logic. The processing logic may comprise hardware (circuitry, dedicated logic, etc.), software (such as is run on a general purpose computer system or a dedicated machine), or a combination of both. These software instructions, or other computer program instructions, may be provided to a processor of a general purpose computer, special purpose computer, or other programmable data processing apparatus to produce the processing logic, such that the instructions, which execute via the processor of the computer or other programmable data processing apparatus, implement the functions specified in the flowchart and/or block diagram block or blocks.

Figure 3:
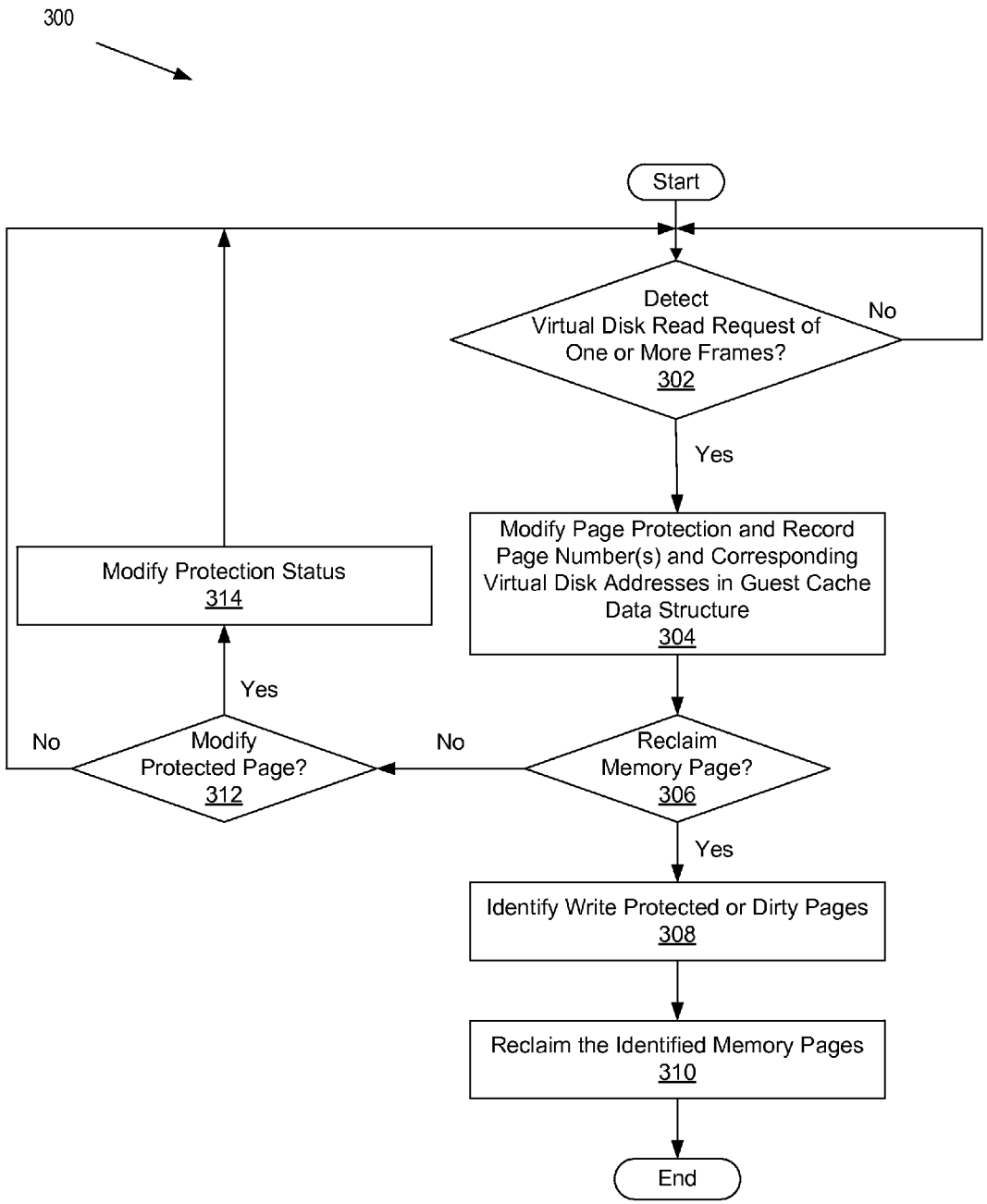
FIG. 3 illustrates a method for processing a virtual memory page according to embodiments of the present invention.

FIG. 3 illustrates a flow diagram of a method 300 for processing a virtual memory page across the lifetime of the page according to embodiments of the present invention. The method 300 is performed by processing logic that may comprise hardware (circuitry, dedicated logic, etc.), software (such as is run on a general purpose computer system or a dedicated machine), or a combination of both. In one embodiment, the method is performed by a VMM (e.g., VMM 112 of FIG. 1).

The method 300 starts and the processing logic, at decision block 302, detects whether a virtual machine has issued a page read request to read an object from a virtual disk into virtual memory. In one embodiment, the processing logic detects a page read request by monitoring virtual disk emulation. For example, if the processing logic detects a request to copy virtual disk data (e.g., via a DMA request) from the virtual device to virtual memory, and the size of the request spans one or more pages, the processing logic write protects the pages used by the VMM to access the pages.

If the processing logic detects a page read request, the processing logic then, at block 304, modifies the protection identifier by modifying page protection and recording the page number(s) and corresponding virtual disk addresses in a guest cache data structure. In one embodiment, the processing logic modifies a protection identifier in a page table to indicate that the virtual memory page is not writable. In a further embodiment, the processing logic modifies the protection identifier by setting a binary value to '1' to indicate the memory page is not writable (e.g., a writeable bit). In an alternative embodiment, processing logic modifies the dirty identifier to indicate that the page is clean and may be reclaimed. In one embodiment, the dirty identifier is a binary value where "0" indicates a clean page and a "1" indicates a dirty page.

At block 306, the processing logic determines if the host server device needs to reclaim memory. The host server device may need to distribute and make available memory 120 to the different applications and processes operating on the host server device 100. If free or available memory 120 diminishes to the point of affecting the performance of the applications and processes, then a memory reclamation event will help free memory for processes and applications.

The processing logic, at block 308 identifies virtual memory pages for reclamation by identifying which virtual memory pages have a protection status indicating a write-protected page. In one embodiment, the processing logic identifies virtual memory pages according to the protection status by analyzing the page table for a protection status of "1," (e.g., a writable bit having a value of "1"). Many varied other status identifiers may be used, as one of skill in the art will recognize. A protection status indicating that the virtual memory page is write-protected indicates that the processing logic may release, or reclaim the memory without concern for data loss because an exact copy of the virtual memory page exists in the virtual disk. At block 310, the processing logic reclaims the identified virtual memory pages and the method 300 ends.

If instead of a memory reclamation event, the processing logic, at block 312, determines that a VM 102, 114 is modifying a page in virtual memory, the processing logic receives a notification that the VM has access that executed without proper permission (e.g., via a page fault exception) that indicates when the VM 102, 114 is modifying a page in virtual memory. The processing logic, at block 314, then modifies the protection status of the modified page. In one embodiment, the processing logic modifies the protection status by setting the protection identifier 208 to writeable. In another embodiment, the processing logic modifies the protection status by setting the dirty bit 208 to "dirty."

Figure 4:
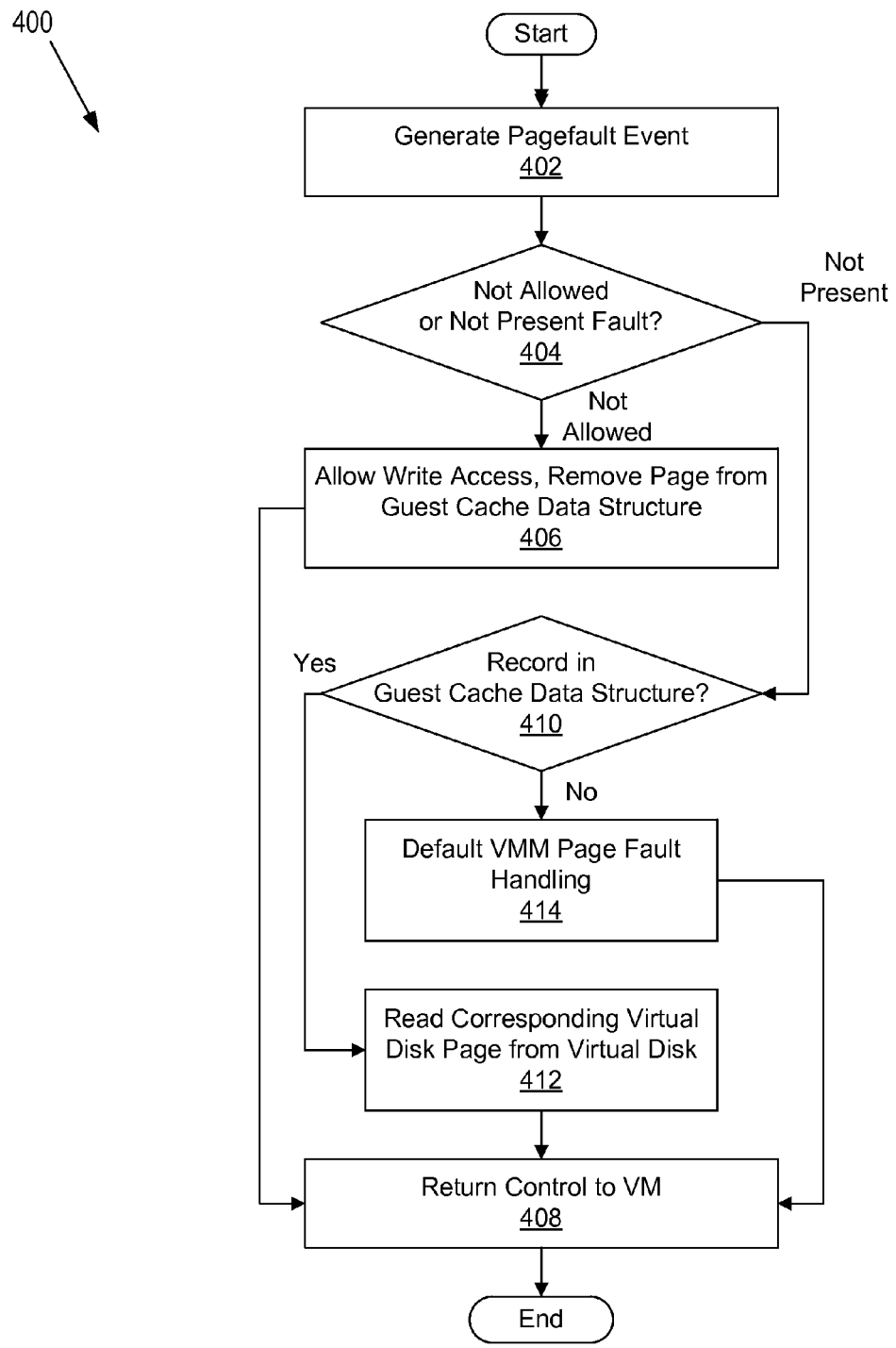
FIG. 4 illustrates a method for accessing a freed memory page in accordance with an embodiment of the invention.

FIG. 4 illustrates a flow diagram of a method 400 for page fault handling of a protected virtual disk cache page in accordance with an embodiment of the invention. The method 400 starts and the processing logic, at block 402, generates a page fault event. The processing logic then determines, at decision block 404, whether the page fault event is a "write-not-allowed" fault or a "page-not-present" fault. If the page fault is the former, the processing logic, at block 406, allows write access to the disk cache page and removes the page from a guest cache data structure. This is because the memory page now differs from data in the virtual disk page. In one example, the processing logic also sets a corresponding writeable bit in the pagetable. The processing logic then, at block 408, returns control (e.g., allows to proceed) the VM.

If, however, the processing logic at decision block 404 determines that the page fault is a "page-not-present" fault, the processing logic searches the guest cache data structure to determine if the record is present. If, at decision block 410, the processing logic determines the record corresponding to the page is in the guest cache data structure, the processing logic at block 412 reads a corresponding virtual disk page from the virtual disk, and then proceeds as described above with reference to block 408. Alternatively, if the record is not in the guest cache data structure, the processing logic at block 414 reverts to default VMM page fault handling.

Figure 5:
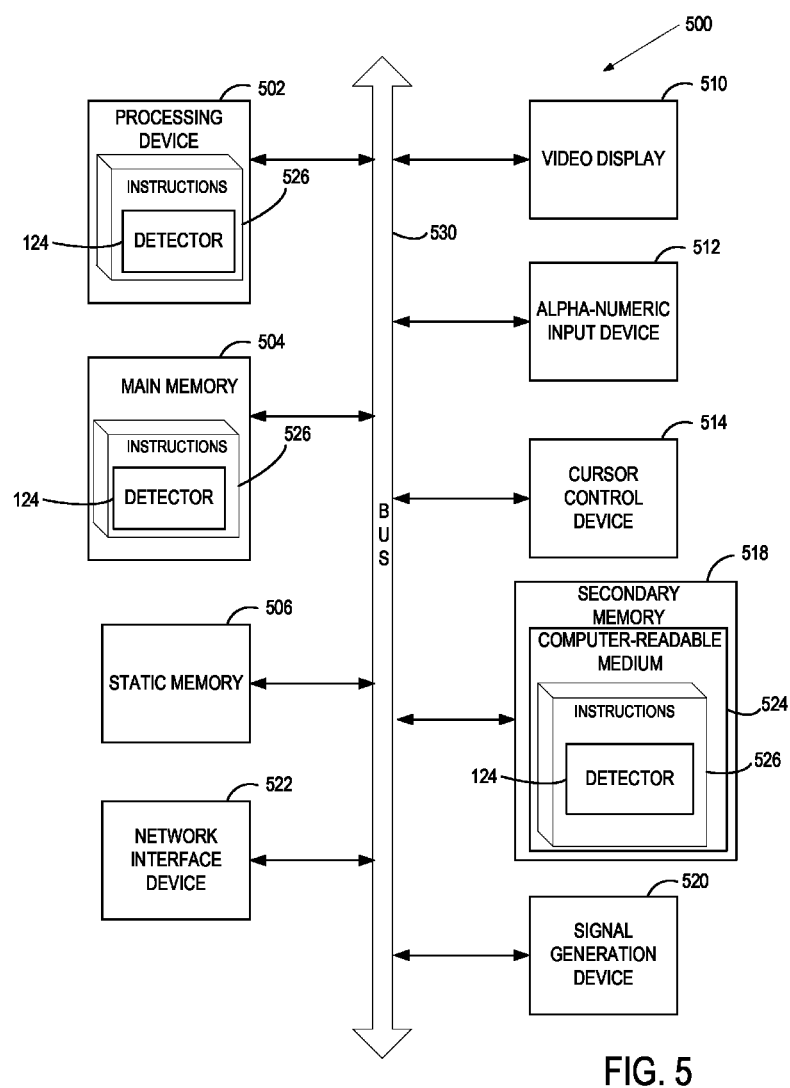
FIG. 5 is a diagram of one embodiment of a computer system for facilitating the execution logging stream serialization.

FIG. 5 is a diagram of one embodiment of a computer system for facilitating the execution logging stream serialization. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a secondary memory 518 (e.g., a data storage device in the form of a drive unit, which may include fixed or removable computer-readable storage medium), which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 518 may include a machine-readable storage medium (or more specifically a computer-readable storage medium) 524 on which is stored one or more sets of instructions 526 embodying any one or more of the methodologies or functions described herein. In one embodiment, the instructions 526 include instructions for the detector 124. The instructions 526 may also reside, completely or at least partially, within the main memory 504 and/or within the processing device 502 during execution thereof by the computer system 500, the main memory 504 and the processing device 502 also constituting machine-readable storage media.

The computer-readable storage medium 524 may also be used to store the instructions 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 526, components and other features described herein can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing," "analyzing," "detecting," "copying," "reclaiming," "identifying," "recording," "accessing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

We claim:

1. A method comprising:
   detecting a request from a virtual operating system to read data from an anonymous memory allocation into a virtual memory page from a virtual disk, wherein the anonymous memory allocation comprises anonymous memory dedicated to a virtual machine and that is freed by the virtual machine while the virtual machine is running;
   maintaining a record of a page identifier and a corresponding first virtual disk address in a guest cache data structure; and
   modifying, by a processing device executing a hypervisor, a first protection identifier of the virtual memory page to indicate that the virtual memory page is write-protected.

2. The method of claim 1, further comprising modifying the first protection identifier of the virtual memory page to indicate that the virtual memory page is not protected when the virtual operating system modifies the virtual memory page.

3. The method of claim 1, further comprising reclaiming anonymous memory when the first protection identifier indicates that the virtual memory page is write-protected.

4. The method of claim 1, further comprising:
   detecting a virtual memory pagefault event;
   identifying a second virtual disk address that corresponds with the virtual memory page of the pagefault event; and
   reading a corresponding virtual disk page from the virtual disk.

5. The method of claim 1, wherein the first protection identifier indicates in a first mode that the virtual memory page is writable and in a second mode that the virtual memory page is not writable.

6. The method of claim 5, further comprising identifying in a page table which of a plurality of page entries has a second protection identifier indicative of the second mode and freeing physical memory corresponding to the identified plurality of page entries.

7. The method of claim 1, further comprising monitoring the page table to identify a lookup request for a page entry associated with the virtual disk.

8. A non-transitory computer readable storage medium comprising executable instructions that, when executed by a processing device, cause the processing device to:
   detect, by the processing device, a request from a virtual operating system to read data from an anonymous memory allocation into a virtual memory page from a virtual disk, wherein the anonymous memory allocation comprises anonymous memory dedicated to a virtual machine and that is freed by the virtual machine while the virtual machine is running;
   maintain, by the processing device, a record of a page identifier and a corresponding first virtual disk address in a guest cache data structure; and
   modify, by the processing device executing a hypervisor, a first protection identifier of the virtual memory page to indicate that the virtual memory page is write-protected.

9. The non-transitory computer readable storage medium of claim 8, wherein the processing device is to modify, by the processing device, the first protection identifier of the virtual memory page to indicate that the virtual memory page is not protected when the virtual operating system modifies the virtual memory page.

10. The non-transitory computer readable storage medium of claim 8, wherein the processing device is to reclaim, by the processing device, the anonymous memory when the first protection identifier indicates that the virtual memory page is protected.

11. The non-transitory computer readable storage medium of claim 8, wherein the processing device is to:
   detect, by the processing device, a virtual memory pagefault event;
   identify, by the processing device, a second virtual disk address that corresponds with the virtual memory page of the pagefault event; and
   read, by the processing device, a corresponding virtual disk page from the virtual disk.

12. The non-transitory computer readable storage medium of claim 8, wherein the first protection identifier indicates in a first mode that the virtual memory page is writable and in a second mode that the virtual memory page is not writable.

13. The non-transitory computer readable storage medium of claim 12, wherein the processing device is to identify, by the processing device, in a page table which of a plurality of page entries has a second protection identifier indicative of the second mode and freeing physical memory corresponding to the identified plurality of page entries.

14. The non-transitory computer readable storage medium of claim 8, wherein the processing device is to monitor, by the processing device, a page table to identify a lookup request for a page entry associated with the virtual disk.

15. An apparatus comprising:
   a memory to store a record of a page identifier; and
   a processing device, coupled to the memory, wherein the processing device is to:
      detect a request from a virtual operating system to read data from an anonymous memory allocation into a virtual memory page from a virtual disk, wherein the anonymous memory allocation comprises anonymous memory dedicated to a virtual machine and that is freed by the virtual machine while the virtual machine is running;
      maintain the record of the page identifier and a corresponding first virtual disk address in a guest cache data structure; and
      modify a first protection identifier of the virtual memory page to indicate that the virtual memory page is write-protected.

16. The apparatus of claim 15, wherein the processing device is further to modify the first protection identifier of the virtual memory page to indicate that the virtual memory page is not protected when the virtual operating system modifies the virtual memory page.

17. The apparatus of claim 15, wherein the processing device is further to reclaim anonymous memory when the first protection identifier indicates that the virtual memory page is protected.

18. The apparatus of claim 15, wherein the processing device is further to:
   detect a virtual memory pagefault event;
   identify a second virtual disk address that corresponds with the virtual memory page of the pagefault event; and
   read a corresponding virtual disk page from the virtual disk.

19. The apparatus of claim 15, wherein the first protection identifier indicates in a first mode that the virtual memory page is writable and in a second mode that the virtual memory page is not writable.

20. The apparatus of claim 19, wherein the processing device is further to identify in a page table which of a plurality of page entries has a second protection identifier indicative of the second mode and freeing physical memory corresponding to the identified plurality of page entries.

* * * * *